United States Patent [19]

Yokote et al.

[11] Patent Number: 5,016,916
[45] Date of Patent: May 21, 1991

[54] MECHANISM FOR ADJUSTING THE POSITION OF SHOULDER ANCHOR

[75] Inventors: Yoshihiro Yokote, Yokohama; Yoshito Hashimoto, Yamato, both of Japan

[73] Assignee: Nippon Seiko Kabushiki Kaisha, Tokyo, Japan

[21] Appl. No.: 452,231

[22] Filed: Dec. 18, 1989

[30] Foreign Application Priority Data

Dec. 24, 1988 [JP] Japan .................. 63-167226[U]
Feb. 2, 1989 [JP] Japan .................. 1-11624[U]
Feb. 6, 1989 [JP] Japan .................. 1-12766[U]

[51] Int. Cl.$^5$ ............................ B60R 22/20
[52] U.S. Cl. ................... 280/808; 280/801; 297/483
[58] Field of Search ........ 280/801, 802, 804, 806, 280/808; 297/464, 468, 483, 484

[56] References Cited

U.S. PATENT DOCUMENTS

| 4,469,352 | 9/1984 | Korner et al. | 280/808 |
| 4,473,243 | 9/1984 | Ogawa | 280/808 |
| 4,611,825 | 9/1986 | Patterson | 280/808 |
| 4,671,468 | 6/1987 | Naito et al. | 280/808 |
| 4,681,346 | 7/1987 | Yoshitsugu | 280/804 |
| 4,682,790 | 7/1987 | Katsuno et al. | 280/801 |

FOREIGN PATENT DOCUMENTS 57-172851 10/1982 Japan .

Primary Examiner—Richard A. Bertsch
Attorney, Agent, or Firm—Wegner, Cantor, Mueller & Player

[57] ABSTRACT

A mechanism for adjusting the position of a shoulder anchor in a passive seat belt system for a vehicle includes a base plate for transmitting a load to the vehicle body and an anchor plate to which a webbing for restraining an occupant is connected. An adjusting-type connection is used between the base plate and the anchor plate so that the anchor plate is adjustable with respect to the base plate both vertically and angularly when the occupant is restrained by the webbing.

8 Claims, 9 Drawing Sheets

MECHANISM FOR ADJUSTING THE POSITION OF SHOULDER ANCHOR

BACKGROUND OF THE INVENTION (1) Field of the Invention

This invention relates to a seat belt system for a vehicle, and more particularly to a mechanism for adjusting the relative angle between a base plate (i.e., a slider) and an anchor plate in the seat belt system.

(2) Description of the Related Art

Passive seat belt systems for automobiles are known in which, after an occupant has seated, a webbing is automatically applied to the occupant. Usually, a guide rail is mounted on an inner wall of an automobile body and a travelling member (slider) carrying the webbing extending therethrough is caused to run on and along the rail to restrain or release the occupant.

In an alternative form, a base plate is attached to a center-pillar-side upper portion of a door, and the webbing is connected to the base plate via an anchor plate. When the door is closed, the webbing restrains the body of an occupant.

Practically, a seat belt system should be useful for occupants of different sizes. So in order to secure the safety for any occupant, it is necessary to adjust the height and angle of a shoulder part of the seat belt system. For this purpose, the known seat belt system is equipped with a mechanism for adjusting the position of a shoulder anchor.

To this end, the adjusting mechanism includes an anchor, to which the webbing is connected, and a base plate (slider) fixed to the automobile body or the door. For adjusting the relative angle between the anchor plate and the base plate (slider) to a most suitable angle depending on the body size of an occupant and the position of a seat while the occupant assumes a restrained position, a pin having a circular cross section is employed at the joint between the base plate (slider) and the anchor plate and serves as a pivot about which the anchor plate is angularly movable.

Figure 22:
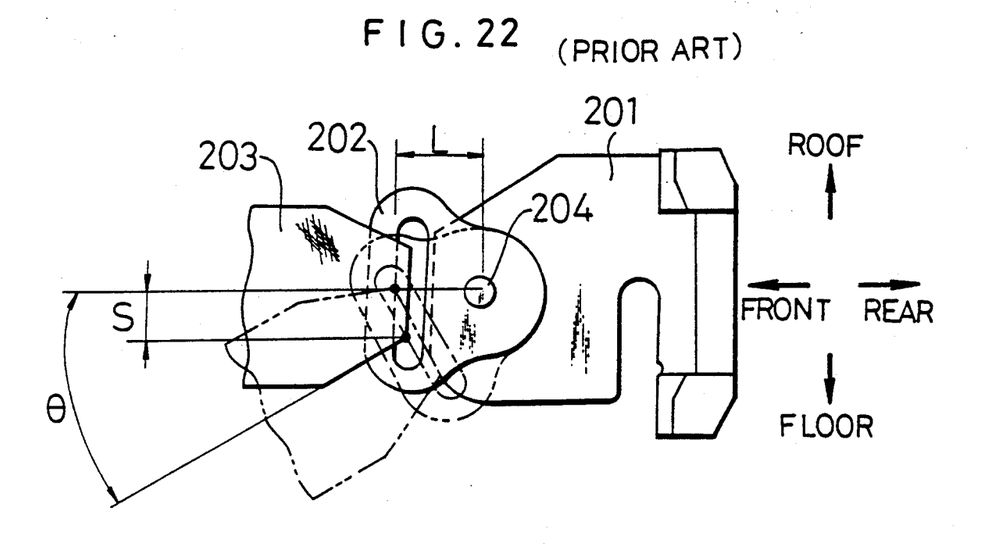
FIG. 22 is a front view showing a prior art adjusting mechanism.

FIG. 22 shows a prior art adjusting mechanism of the type in which the anchor plate is angularly movable about a pivot pin. In the prior art adjusting mechanism, the extent of vertical adjustment is determined by the angle of rotation $\theta$ and the distance L from the center of rotation to a webbing attaching point. However, since the webbing attaching point located most preferably rearwardly of the automobile body, it is also preferable to reduce the distance L to a minimum. Consequently with this prior art mechanism, only inadequate effect can be achieved in vertical adjustment.

Yet, if it could be considered to achieve an adjustment by moving the anchor plate and the base plate vertically, the base plate (or the anchor plate) is necessarily large in the type in which the base plate is movable along a guide rail. This is contrary to the rule that a movable member should be preferably small in size. Therefore the prior art arrangement is not practical.

SUMMARY OF THE INVENTION

It is accordingly an object of this invention to provide a mechanism for adjusting the position of a shoulder anchor to a most suitable position inexpensively and rationally as a vertical adjustment and/or a rotational adjustment are possible at the joint between an anchor plate and a base plate.

The operation of the adjusting mechanism of this invention will now be described in comparison with the prior art mechanism.

FIG. 22 shows the prior art mechanism in which a base plate 201 and an anchor plate 202 are pivotally connected to each other by a pin 204 so that these two plates 201, 202 are angularly movable with respect to each other about the pin 204. When the anchor plate 201 is angularly moved about the pin 204 through an angle of $\theta$ with respect to the base plate 202, the amount of vertical adjustment is S ($=L \times \sin \theta$).

Figure 23:
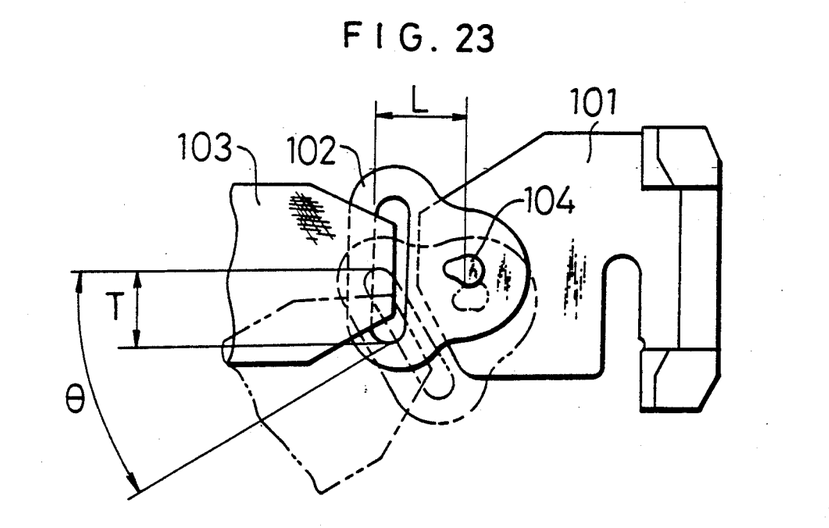
FIG. 23 is a schematic front view of the adjusting mechanism of this invention, illustrating the principles of this invention.

FIG. 23 illustrates the principles of this invention. In the adjusting mechanism of FIG. 23, a pin 104 having a generally egg-shaped cross section, i.e., a non-circular cross section, is fixed to an anchor plate 102 and is engageable with upper and lower engaging holes formed in a base plate 101. As the pin 104 is in engagement with either the upper engaging hole or the lower engaging hole, the angle between the base plate 101 and the anchor plate 102 is determined. The anchor plate 102 is normally urged forwardly with respect to the base plate 101 by a non-illustrated bias means.

When the anchor plate 102 is angularly moved about the pin 104 through an angle of $\theta$ with respect to the base plate 202, the amount of vertical adjustment is T ($>S$). At that time, the anchor plate 102 is moved downwardly by the distance between the upper and lower engaging holes so that the center of equivalent rotation is moved rearwardly downwardly to produce an effect as if L could become geometrically increased. Therefore it is possible to take an increased amount of vertical adjustment without increasing L.

Further, with the adjusting mechanism of this invention, since the engagement between the base plate and the anchor plate is performed by the combination of the pin and the hole or notches complementary in shape to the non-circular cross-sectional shape, it is possible to adjust the relative angle between the base plate and the anchor plate.

The above and other advantages, features and additional objects of this invention will be manifest to those versed in the art upon making reference to the following detailed description and the accompanying drawings in which several structural embodiments incorporating the principles of this invention are shown by way of illustrative example.

DETAILED DESCRIPTION OF THE INVENTION

Preferred embodiments of this invention will now be described in greater detail with reference to the accompanying drawings.

Figure 1:
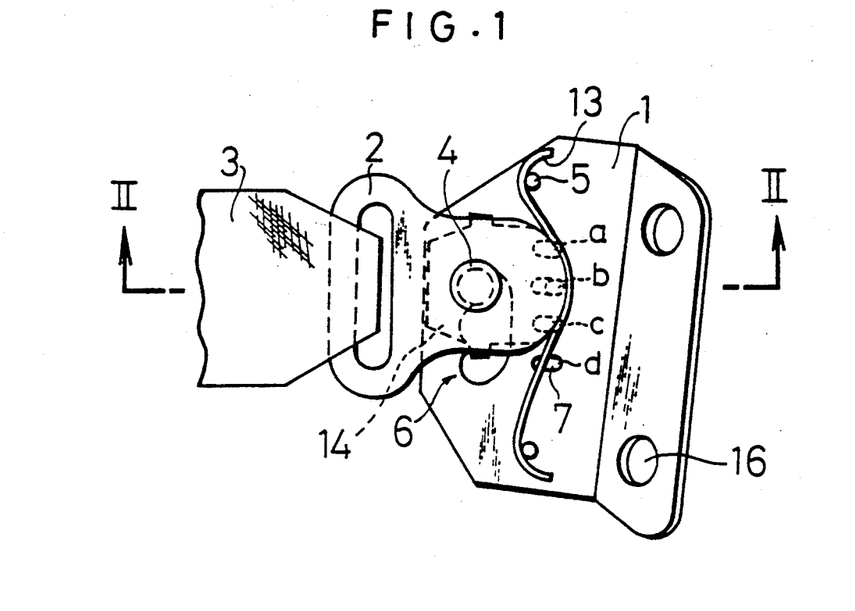
FIG. 1 is a front view of a shoulder anchor adjusting mechanism according to a first embodiment of this invention.
Figure 2:
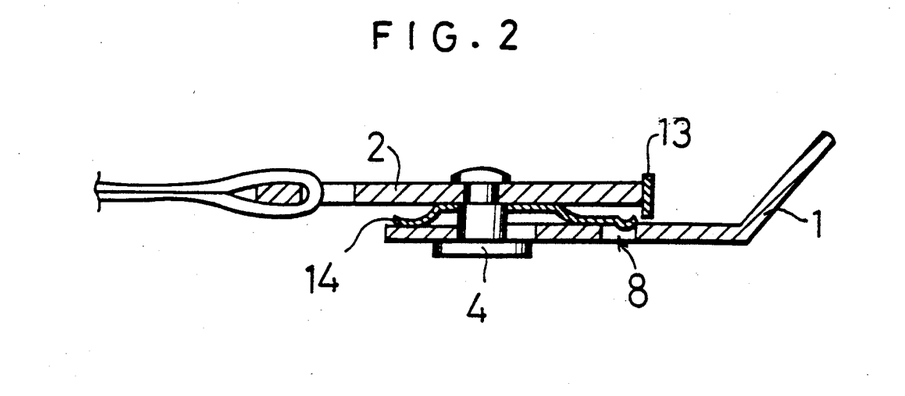
FIG. 2 is a cross-sectional view taken along line II—II of FIG. 1.

FIGS. 1 and 2 show a shoulder anchor adjusting mechanism according to a first embodiment of this invention.

The shoulder anchor adjusting mechanism of FIGS. 1 and 2 generally comprises an anchor plate 2 to which a pin 4 is fixed, and a base plate 1 in which three engageable portions 6 engageable with the pin 4 are formed for positioning the anchor plate 2 vertically. The engageable portions 6 are defined in a W-shaped hole in which the pin 4 is movably received.

The base plate 1 also has a plurality of vertically spaced slots 7 for positioning the anchor plate 2 angularly as a projection 8 of a leaf spring 14 attached to the anchor plate 2 is selectively engageable with one of the slots 7. In this illustrated embodiment, the base plate 1 has a flange adapted to be attached to a door sash of an automobile body and having attachment holes 16 for this purpose.

A webbing 3 is connected to the anchor plate 2. The leaf spring 14 is sandwiched between the base plate 1 and the anchor plate 2, being pressed against the anchor plate 2 by the base plate 2 and the pin 4.

The leaf spring 14 is positioned with respect to the anchor plate 2 by a pair of opposite flanges projecting so as to hold the anchor plate 2 and normally urges the anchor plate 2 and the base plate 1 away from each other. Also the leaf spring 14 has a projection 8 engageable with a selected one of the slots 7 formed in the base plate 1.

Another leaf spring 13 is supported by a pair of fixed pins 5 on the base plate 1 and normally urges the anchor plate 2 forwardly, thereby securing the engagement between the pin 4 on the anchor plate 2 and the engageable portions 6.

For adjusting the position of the anchor plate 2, the anchor plate 2 is moved rearwardly against the bias of the leaf spring 13, and then the anchor plate 2 is moved vertically. In any engaged position, as the anchor plate 2 is angularly moved, the projection 8 of the leaf spring 14 is brought out of engagement with the slot 7 of the base plate 1 and can be adjusted to a determined angular position. In the position of FIG. 1, the projection 8 of the leaf spring 14 is in engagement with the slot 7 (b) and may be engageable with the slot 7 (a) or (c). In each engaged position, two or three angular adjustments are possible.

Figures 3, 4:
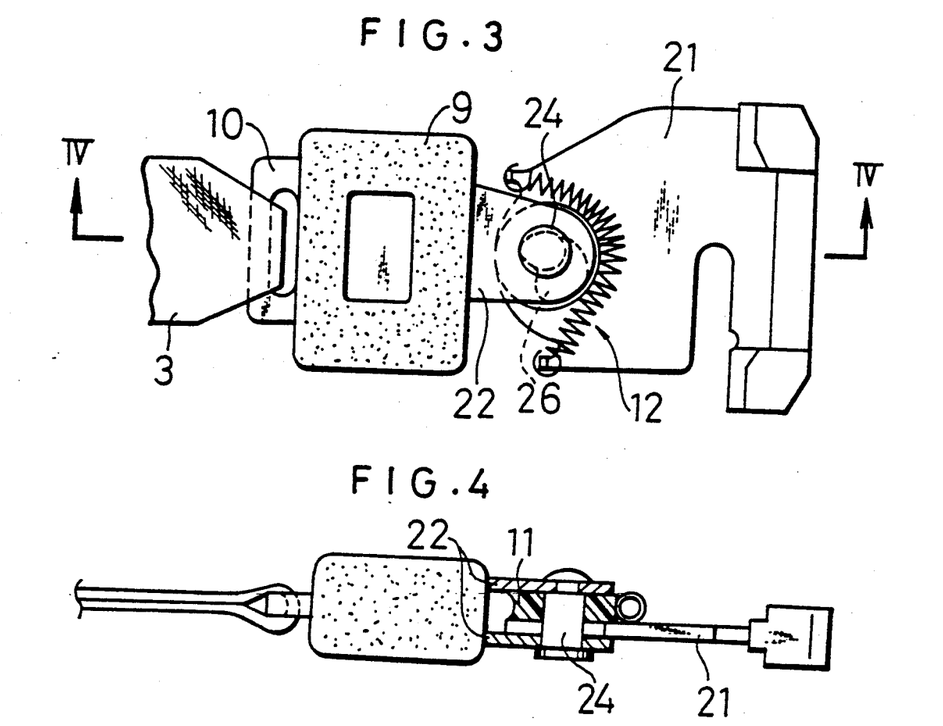
FIG. 3 is a front view of a shoulder anchor adjusting mechanism according to a second embodiment.
FIG. 4 is a cross-sectional view taken along line IV—IV of FIG. 3.

FIGS. 3 and 4 show a second embodiment, in which a base plate 21 is a slide plate of a slider movable along a rail, and a pair of anchor plates 22 are a buckle base unified with a buckle 9. The base plate 21 (slide plate) and a spacer 11 are inserted between the two anchor plates 22 (buckle base), and a pin 24 is threaded through the anchor plate 22, the base plate 21 and the spacer 11.

The pin 24 is fixed to the anchor plate 22 (buckle base), and the base plate 21 (slide plate) and the spacer 11 are spaced from the buckle base by a suitable gap. The pin has a non-circular cross section with at least one engaging projection for positioning the anchor plates 22 angularly.

The base plate 21 (slide plate) has engageable portions for positioning the anchor plates 22 vertically and angularly. The engageable portions 26 are in the form of a generally V-shaped hole. The anchor plates 22 (buckle base) is normally urged forwardly by a spring 12 to secure the engagement between the pin 24 and one of the engageable portions 26. Therefore, when the pin 24 fixed to the anchor plates 22 (buckle base) comes in engagement with one of the engageable portions 26, the angle of the anchor plates 22 with respect to the base plate 21 can be adjusted under the bias of the spring 12.

Figure 5:
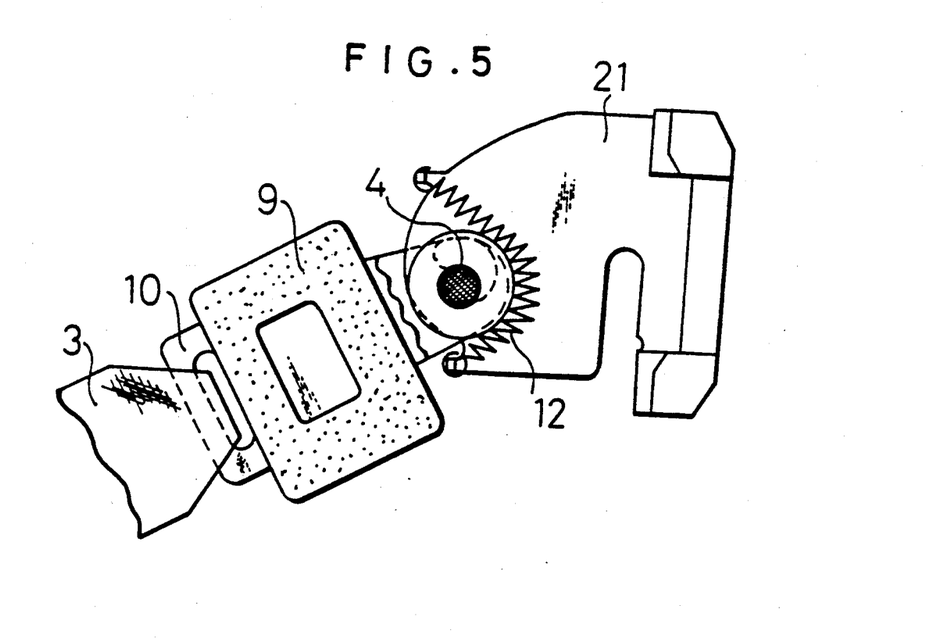
FIG. 5 shows the shoulder anchor adjusting mechanism assuming a downwardly adjusted position.

FIG. 5 shows the anchor plates 22 (buckle base) having been adjusted downwardly in position and angle by bringing the pin 24 into engagement with the lower engageable portion 26.

Figure 6:
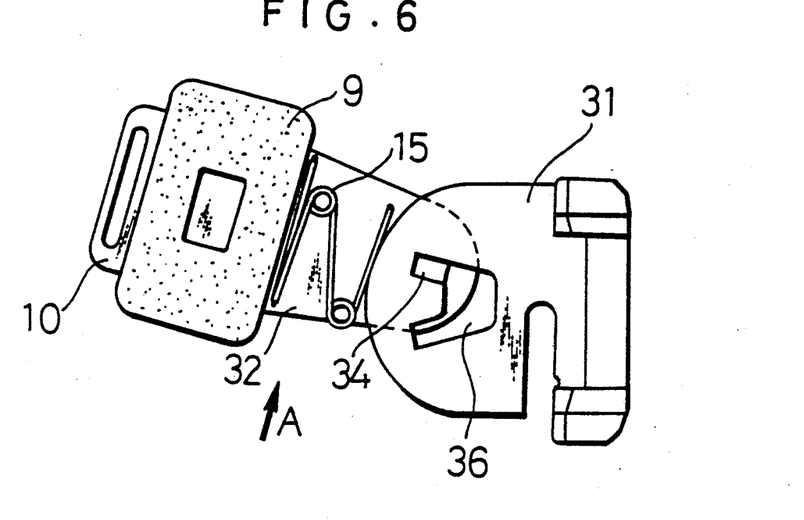
FIG. 6 is a front view of a shoulder anchor adjusting mechanism according to a third embodiment.

FIG. 6 shows a third embodiment, in which an anchor plate 32 is unified with a buckle 9 having a tongue 10. A pin 34 having a rectangular cross section is fixedly secured to the anchor plate 32.

Like the second embodiment, a base plate 31 is a slide plate. A hole 36 engageable with the pin 34 is formed in the base plate 31. For determining the position and orientation of the anchor plate 32, the hole 36 includes a plurality of rectangular portions each complementary with the cross-sectional shape of the pin 34 and engageable therewith, and a passage portion via which the pin 34 is movable from one rectangular portion to another. In this embodiment, the engageable portions are a pair of vertically spaced portions, i.e., upper and lower portions.

Preferably, the pin 34 has round corners so that an angular adjustment can be performed smoothly. Likewise the hole 36 of the base plate 31 has round corners.

A torsion spring 15 is fixed only at one end to the anchor plate 32, with the other end only disposed against the base plate 31, thus normally urging the base plate 31 and the anchor plate 32 away from each other. Therefore, the pin 34 is normally urged in stable engagement with the hole 36 of the base plate 31, irrespective of the relative angle between the base plate 31 and the anchor plate 32.

Figure 7:
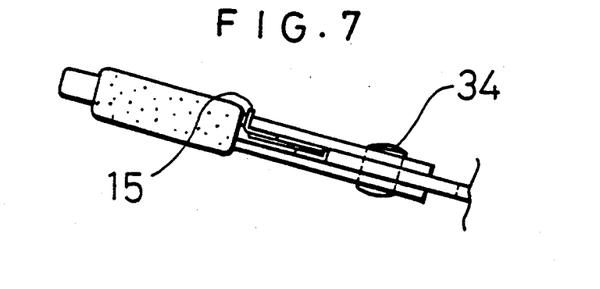
FIG. 7 is a view as seen in a direction A of FIG. 6.

As shown in FIG. 7, the anchor plate 32 has a horizontally elongated generally C-shaped cross section. The central portion of the C-shaped anchor plate 32 is embedded in the buckle 9, and the pin 34 is fixed to the ends of upper and lower tongue-shaped portions of the C-shaped anchor plate 32. The base plate 31 is sandwiched between the upper and lower tongue-shaped portions of the anchor plate 32 and is slidable when taking an angular adjustment.

Figure 8:
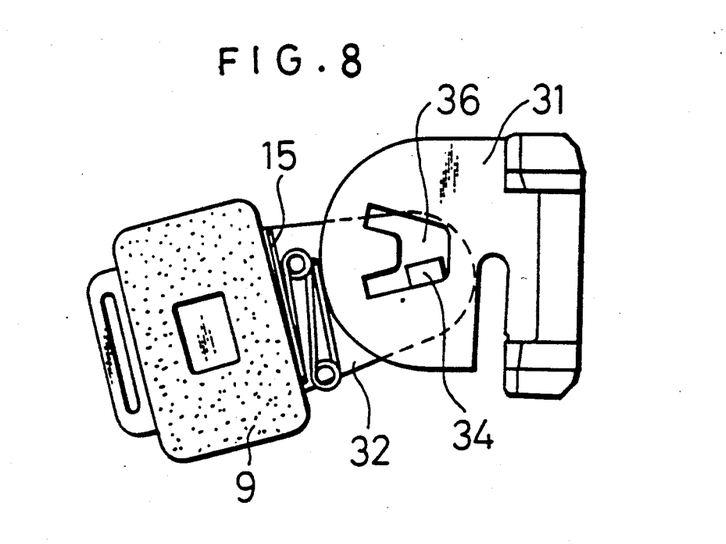
FIG. 8 shows the manner in which the angle of a shoulder anchor is adjusted.

For angular adjustment, in FIG. 8, the anchor plate 32 is pushed forwardly against the bias of the spring 15 to remove the pin 34 from the engageable portion of the hole 36 into the passage portion of the hole 36. With the anchor plate 32 pushed against the bias of the spring 15, the anchor plate 32 is moved upwardly or downwardly, whereupon the pushing force is released from the anchor plate 32 so that the pin 34 comes in engagement with the upper or lower engageable portion under the bias of the spring 15. Thus an angular adjustment has been completed.

Figure 9:
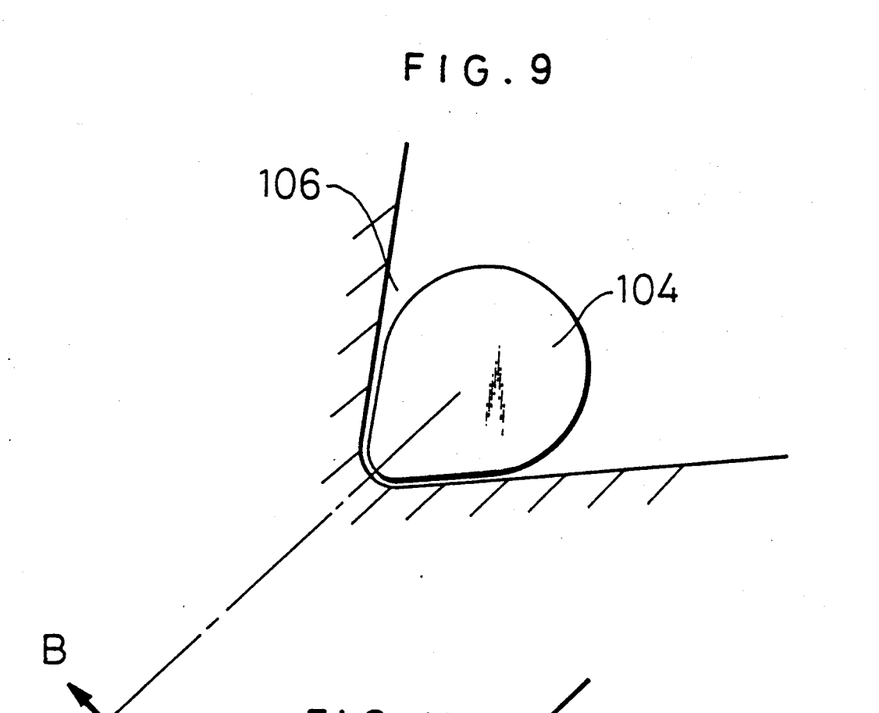
FIG. 9 is a schematic cross-sectional view showing an example using a pin having a generally egg-shaped cross section.

The operation and result of the third embodiment will now be described. As shown in FIG. 9, if the pin 104 has an oval or egg-shaped cross section, the operation for angular adjustment is simple and the force of maintaining the angle is small. Specifically, if the rotational moment acts on the anchor plate 102 in the direction B or C the pin 104 tends to rotation in that direction, so that the relative angle between the anchor plate 102 and the base plate 101 sometimes cannot be maintained, even though the pin 104 is in engagement with the hole 106 of the base plate 101.

Figure 10:
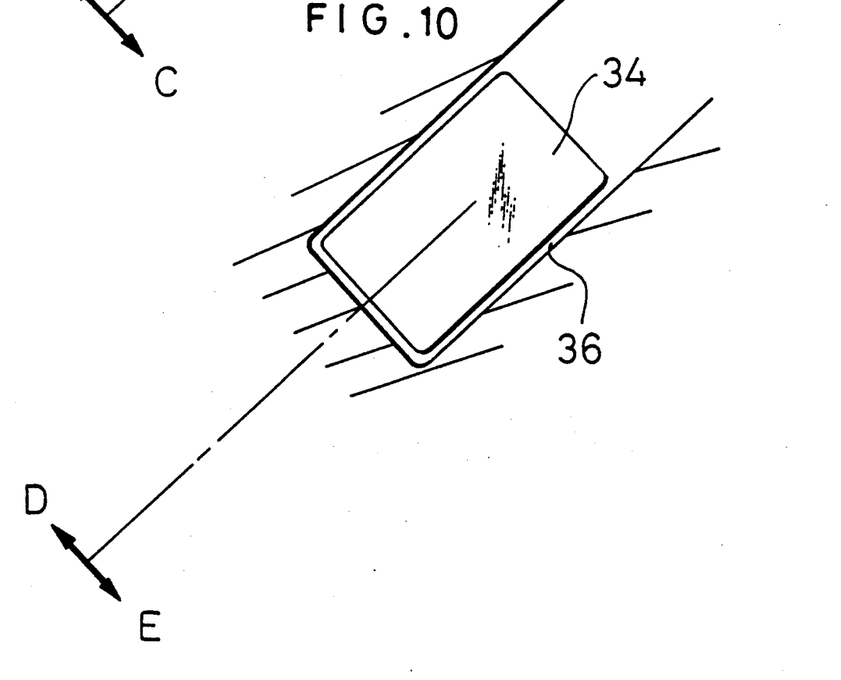
FIG. 10 is a schematic cross-sectional view showing another example using a pin having a rectangular cross section.

As shown in FIG. 10, if the pin 34 has a rectangular cross section, the pin 34 would not tend to rotate even though the rotational moment D or E acts on the anchor plate 32. Since the pin 34 is fixed to the anchor plate 32, the relative angle of the anchor plate 32 with respect to the base plate 31 can be maintained reliably. Consequently, when the angle of the anchor plate 32 is determined with the pin 34 engaged in the hole 36 of the base plate 31, the anchor plate 32 would not become non-stable.

Figure 11:
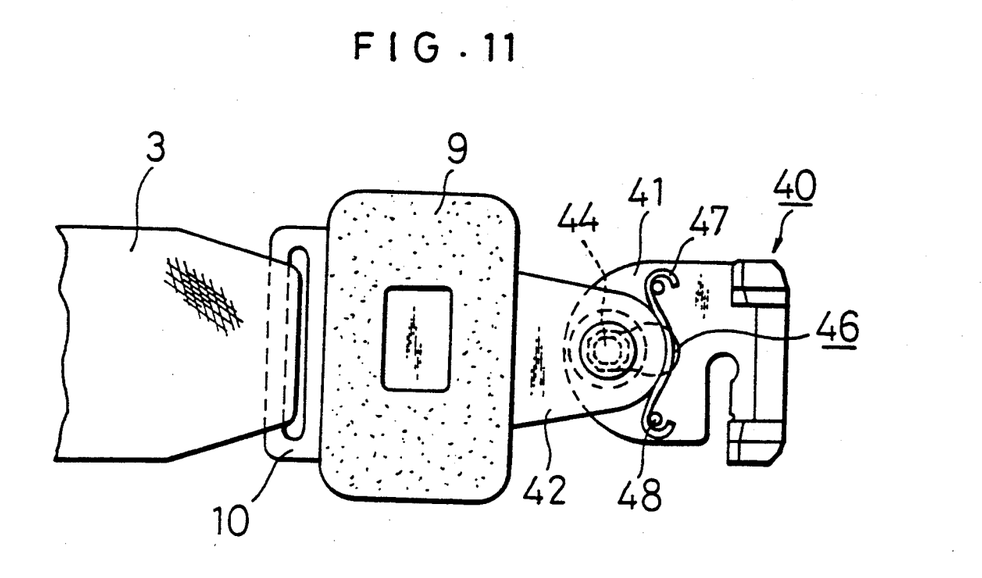
FIG. 11 is a front view of a shoulder anchor adjusting mechanism according to a fourth embodiment.
Figure 12:
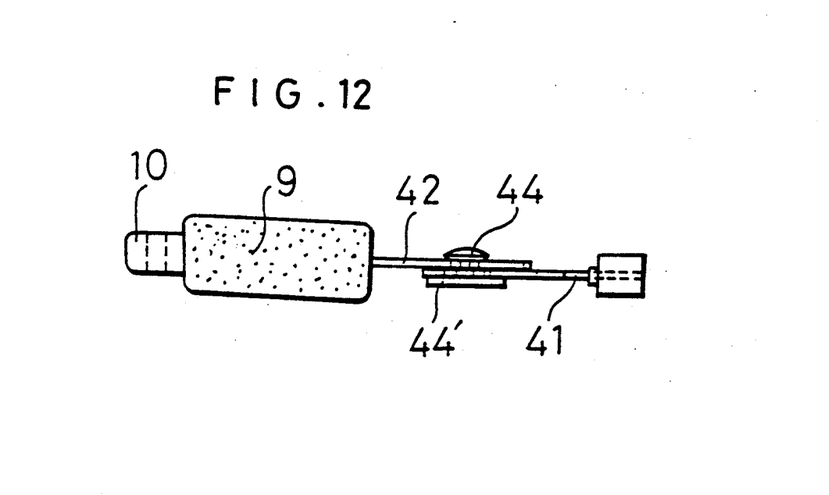
FIG. 12 is a bottom view of FIG. 11.
Figure 13:
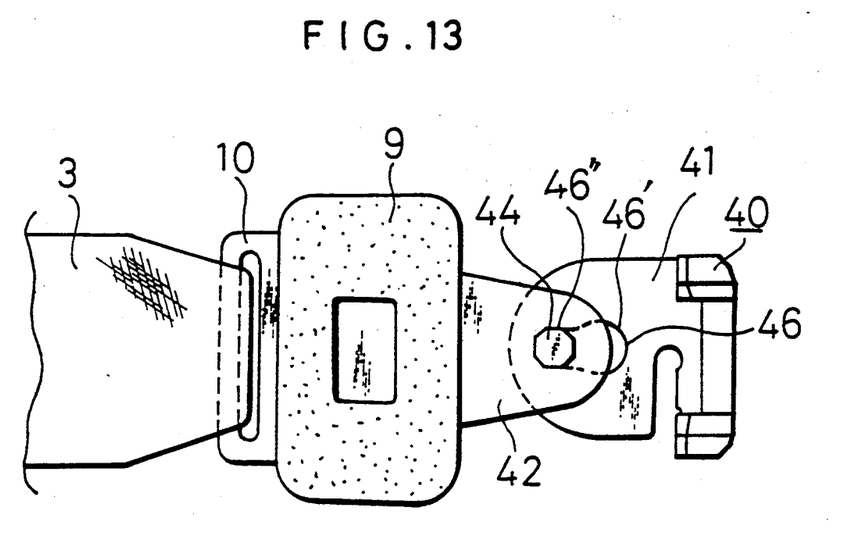
FIG. 13 is a view similar to FIG. 11, showing the manner in which an anchor plate and a base plate are engaged with each other.

FIGS. 11 to 13 show a fourth embodiment, in which a base plate 41 (slide plate) of a slider 40 has an hole 46 having a large-diameter portion 46' and a small-diameter portion 46" continuous therewith. The small-diameter portion 46" is hexagonal, while the large-diameter portion 46' is circular.

A pin 44 having a hexagonal cross section is fixed to an anchor plate 42. The pin 44 has a head 44' flattened so as to have a diameter slightly larger than the large-diameter portion of the hole 46.

The anchor plate 42 is unified with the buckle 9. To the buckle 9, the tongue 10 to which the webbing 3 is attached by sewing is fixed. The engagement between the anchor plate 42 and the base plate 41 is performed by the hexagonal portion of the pin 44 fixed to the anchor plate 42, and the small-diameter portion 46" of the hole 46 formed in the base plate 41. Since the anchor plate 42 is normally urged toward the small-diameter portion 46" by the leaf spring 47, the anchor plate 42 is prevented from moving from the small-diameter portion 46" to the large-diameter portion 46'. Further, since the head 44' of the pin 44 is larger than the large-diameter portion 46', the pin 44 is prevented from being removed from the large-diameter portion 46'. Designated by 48 are projections for holding a leaf spring 47.

Figure 14:
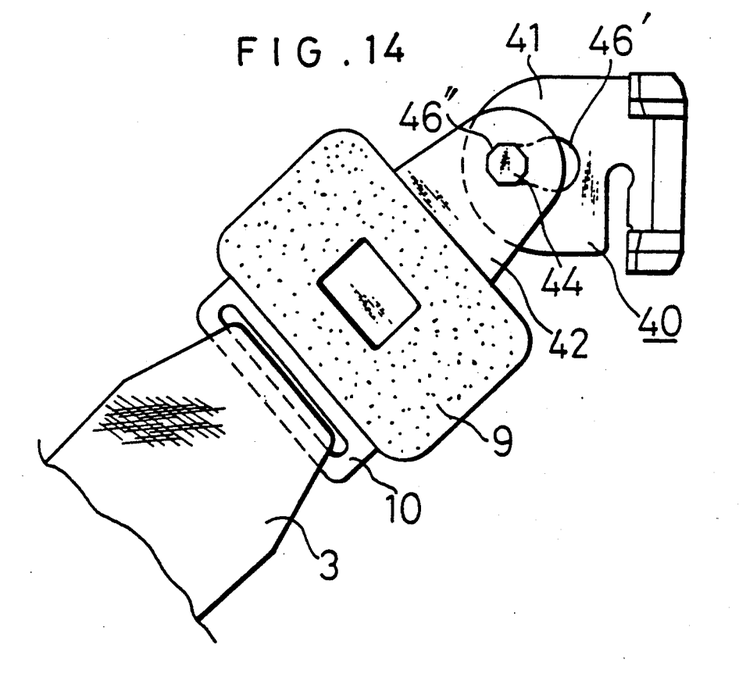
FIG. 14 shows the shoulder anchor adjusting mechanism assuming an angularly adjusted position in which the relative angle between the anchor plate and the base plate has been altered.

For varying the relative angle between the anchor plate 42 and the base plate 41, the anchor plate 42 is first moved to the large-diameter portion 46' against the bias of the leaf spring 47 to bring the pin 44 out of engagement with the small-diameter portion 46", and is then angularly moved to assume an optional angular position. Thereafter, the anchor plate 42 is moved to the small-diameter portion 46" to fit the pin 44 in the small-diameter portion 46". FIG. 14 shows the anchor plate 42 after its angle with respect to the base plate 41 has been altered.

Figure 15:
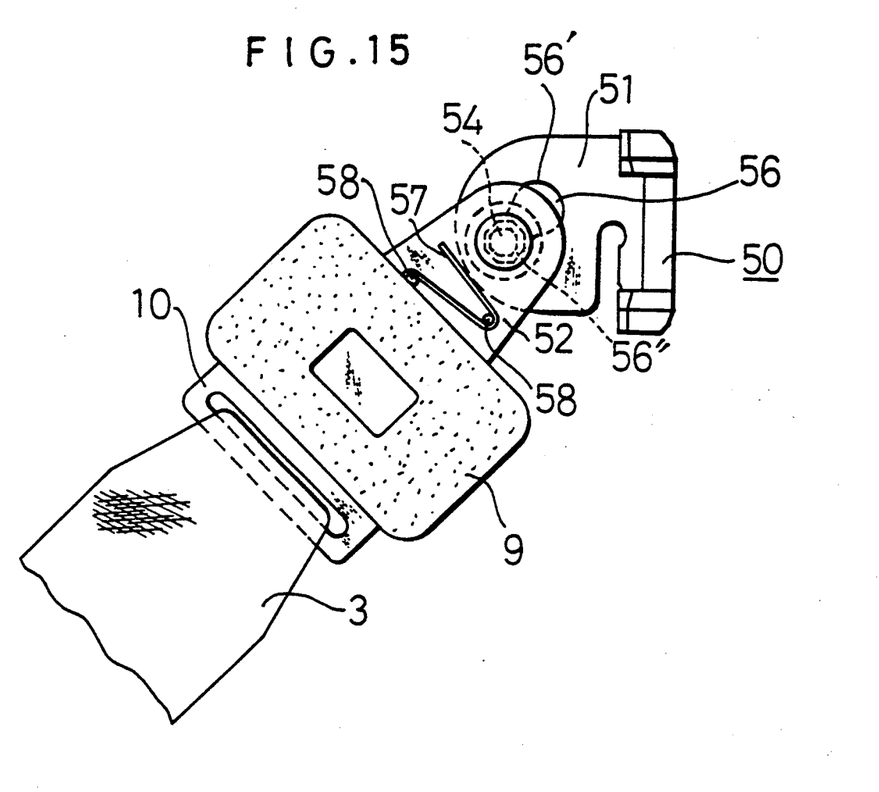
FIG. 15 is a front view of a shoulder anchor adjusting mechanism according to a fifth embodiment.
Figure 16:
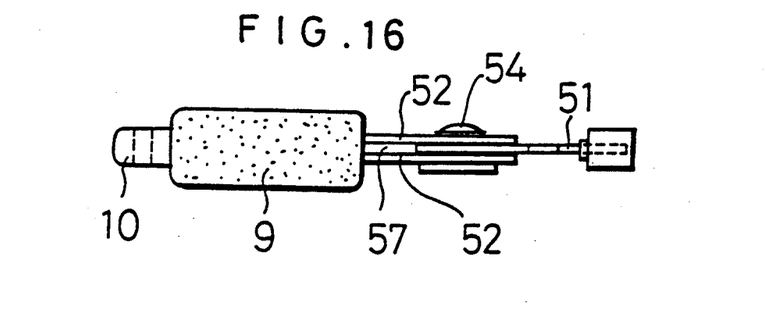
FIG. 16 is a bottom view of FIG. 15.

FIGS. 15 and 16 show a fifth embodiment, in which a pair of anchor plates 52, 52 parallel spaced a suitable gap from each other is fixedly secured to the hexagonal pin 54. The base plate has a hole 56 which is identical with that of the first embodiment, except that the hole 56 is inclined by about an angle of 45° with respect to the horizontal. A spring 57 is disposed between the two anchor plates 52, 52 near the buckle 9 to normally urge the base plate 51 so that the pin 54 fixed to the anchor plates 52 is normally in engagement with the small-diameter portion 56" of the hole 56 formed in the base plate 51. Since the hole 56 is inclined as discussed above, the pin 54 is normally kept in contact with the small-diameter portion 56" due to the force acting on the webbing 3. It is therefore possible to prevent the anchor plate 51 from being removed from the base plate 52 due to vibrations. Designated by 58 is a projections for retaining the beef spring 57.

For altering the relative angle between the anchor plate 52 and the base plate 51, the same procedures as the first embodiment are conducted.

Figure 17:
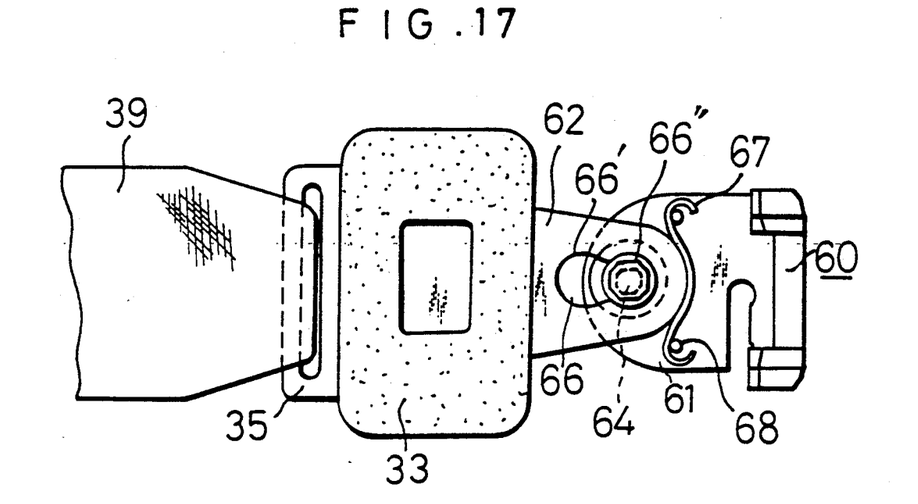
FIG. 17 is a front view of a shoulder anchor adjusting mechanism according to a sixth embodiment.

FIG. 17 shows a sixth embodiment, in which a hexagonal pin 64 is fixed on a base plate 61, and a hole 66 is formed in an anchor plate 62. The hole has a small-diameter portion 66" and a large-diameter portion 66' continuous therewith. Although the hexagonal pin 44 is fixed on the anchor plate 42 in the fourth embodiment (FIGS. 11 and 12), the corresponding hexagonal pin 64 is fixed on the base plate 61 in this embodiment. Also with this arrangement, it is possible to alter the relative angle between the anchor plate 62 and the base plate 61 in the same manner as the fourth embodiment.

Figure 18:
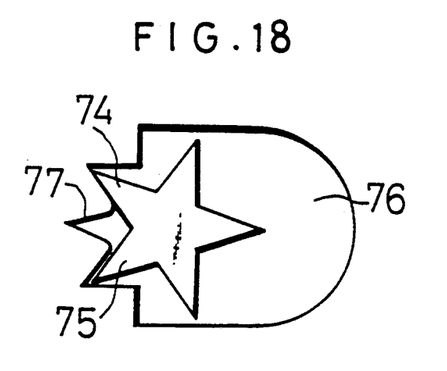
FIG. 18 shows a seventh embodiment.
Figure 19:
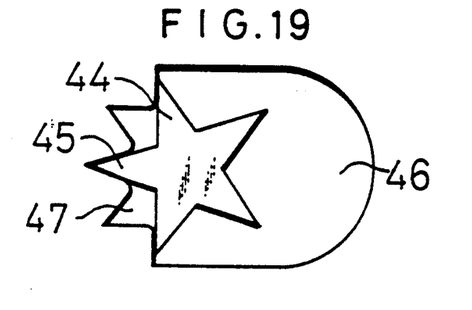
FIG. 19 is a view similar to FIG. 18, showing the manner in which the angle between the anchor plate and the base plate has been altered.

FIGS. 18 and 19 show a seventh embodiment, in which a pin 74 has a star-shaped cross section with a plurality of acute apexes 75, and a hole 76 has at one side a plurality of acute notches 77 for receiving some of the acute apexes 75 of the pin 74, each notch 77 being complementary in shape with one of the acute apexes 75.

Figure 20:
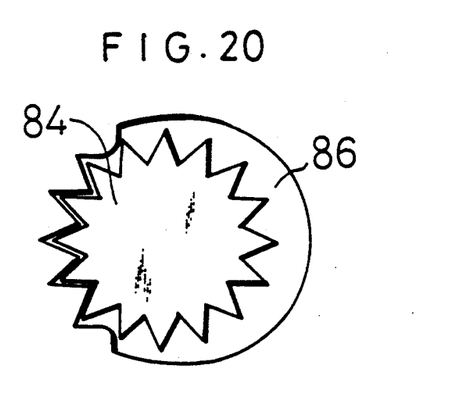
FIG. 20 shows an eighth embodiment.
Figure 21:
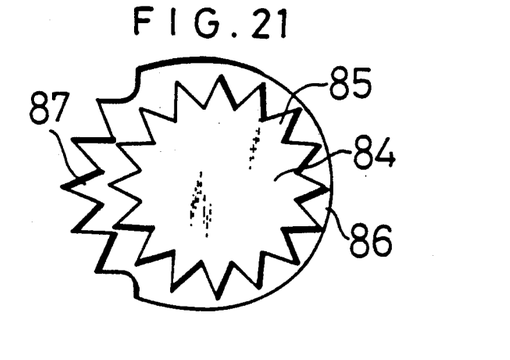
FIG. 21 is a view similar to FIG. 20, showing the manner in which the angle between the anchor plate and the base plate is being altered.

FIGS. 20 and 21 show an eighth embodiment, in which a pin 84 is in the form of a gear with a plurality of acute ridges 85. A hole 86 is substantially circular and has at one side a plurality of notches 87 for receiving some of the acute ridges 85, each notch 87 being complementary in shape with one of the acute ridges 85. The more the notches 87, the finer the angular adjustment can be performed. Since the acute ridges 85 of the pin 84 can be smaller than those of the other embodiments, the notches 87 also may be small. Further, for altering the relative angle between the anchor plate and the base plate, the pin 84 is released from the notches 87, and then the base plate or the anchor plate is angularly moved. The hole 86 may be slightly larger than the pin 84.

In the seventh and eighth embodiments, only the shape each of the cross section of the respective pin and the respective hole are illustrated. The pin may be fixed on the anchor plate, and the hole may be formed in the base plate, like the fourth embodiment. Alternatively, the pin may be fixed on the base plate, and the hole may be formed in the anchor plate, like the sixth embodiment.

Further, although most of the embodiments are described here as applied to a passive seat belt system of the type having a slidable base plate, this invention should by no means be limited to a passive seat belt system of the type in which the base plate is fixed to a door of the automobile, like the first embodiment. This invention may also be applied to a seat belt system of the type in which the base plate is fixed to the upper portion of a center pillar of the automobile.

According to this invention, since a plurality of engageable portions for vertical adjustment are formed in the base plate, an adjusting mechanism simple in construction and compact in size can be realized without increasing the number of component parts. Yet it is possible to increase the amount of vertical and angular adjustments of the anchor plate.

Further, by increasing the number of corners of a non-circular pin or the number of notches of a hole engageable with the pin, a multi-step angular adjustment can be achieved, compared with the prior art adjustment. Thus it is possible to adjust the relative angle between the base plate and the anchor plate, depending on the size of an occupant and the position of a seat.

What is claimed is:

1. A mechanism for adjusting the position of a shoulder anchor in a seat belt system of a vehicle, comprising:
   a base plate for transmitting a load to a body of the vehicle;
   an anchor plate having a webbing-connecting portion to which a webbing for restraining an occupant is connected; and
   connecting means disposed between said base plate and said anchor plate for connecting said base plate and said anchor plate in such a way that said anchor plate can be selectively held at a first position or at a second position, said connecting means comprising a first connection point for said first position and a second connection point for said second position disposed in a vehicle downward direction with respect to said first connection point;
   wherein at said first position the webbing-connecting portion is situated in a vehicle forward direction with respect to the connecting means; and
   wherein at said second position said anchor plate has been rotated a predetermined angle about said connecting means.

2. A mechanism according to claim 1, wherein said connecting means comprises a pin having a non-circular cross-section mounted on one of said base plate and said anchor plate and an engagement hole formed in the other one of said base plate and said anchor plate and having an engagement portion engageable with said pin.

3. A mechanism according to claim 2, wherein said engagement hole has a substantially V-shaped opening which opens toward the webbing-connecting portion of said anchor plate.

4. A mechanism according to claim 3, wherein said pin has a substantially egg-like transverse cross-sectional shape.

5. A mechanism according to claim 3, wherein said pin has a substantially rectangular transverse cross-sectional shape.

6. A mechanism according to claim 2, further comprising a bias means for biasing said pin toward said engagement portion.

7. A mechanism according to claim 1, wherein said base plate is fixed to a door sash of the vehicle.

8. A mechanism, according to claim 1, wherein said base plate is a slide plate of a slider movable along a guide rail attached to the body of the vehicle.

* * * * *